United States Patent [15] 3,700,062
Garnett [45] Oct. 24, 1972

[54] NEUTRAL DEVICE FOR INTERNAL COMBUSTION ENGINE POWERED TRUCKS

[72] Inventor: Donald Garnett, Homewood, Ill.

[73] Assignee: Allis-Chalmers Manufacturing Company, Milwaukee, Wis.

[22] Filed: Dec. 10, 1970

[21] Appl. No.: 96,886

[52] U.S. Cl. ..................180/101, 74/96, 180/82
[51] Int. Cl. ...................B60k 23/00, B60r 21/00
[58] Field of Search ............180/101, 82; 188/24

[56] References Cited

UNITED STATES PATENTS 3,314,504 4/1967 Altenburger...............188/24
3,265,150 8/1966 Westman...................180/101

*Primary Examiner*—Kenneth H. Betts
*Assistant Examiner*—John P. Silverstrim
*Attorney*—Charles L. Schwab, Robert B. Benson and Kenneth C. McKivett

[57] ABSTRACT

The vehicle transmission is automatically placed in a neutral condition at the time the operator's seat is vacated. This is achieved by a seat actuated mechanism including a cable operated control structure which moves a reciprocating element of the shift control linkage to neutral from either of its forward and neutral positions when the vacated seat is shifted upwardly by spring means.

4 Claims, 9 Drawing Figures

PATENTED OCT 24 1972
3,700,062
SHEET 1 OF 2
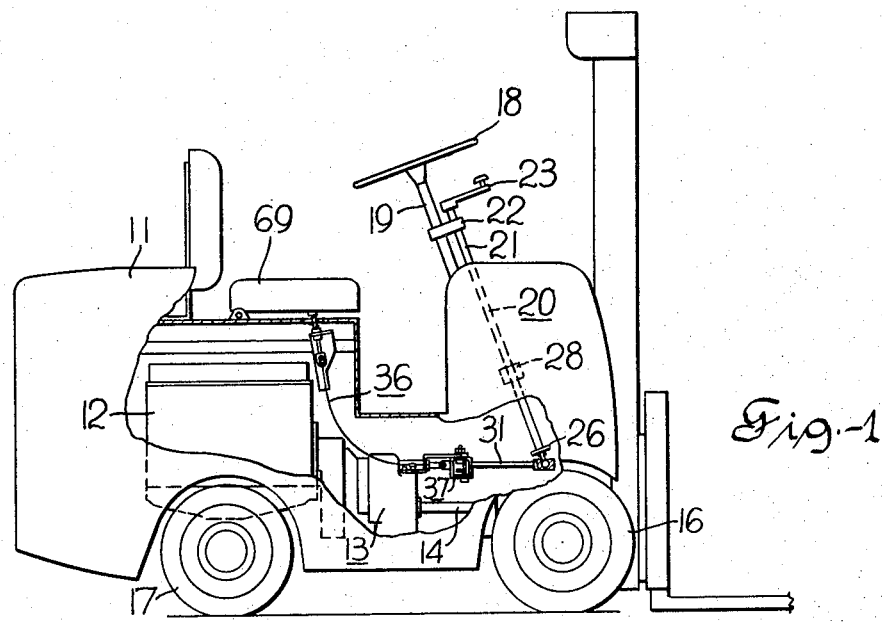
Fig.-1
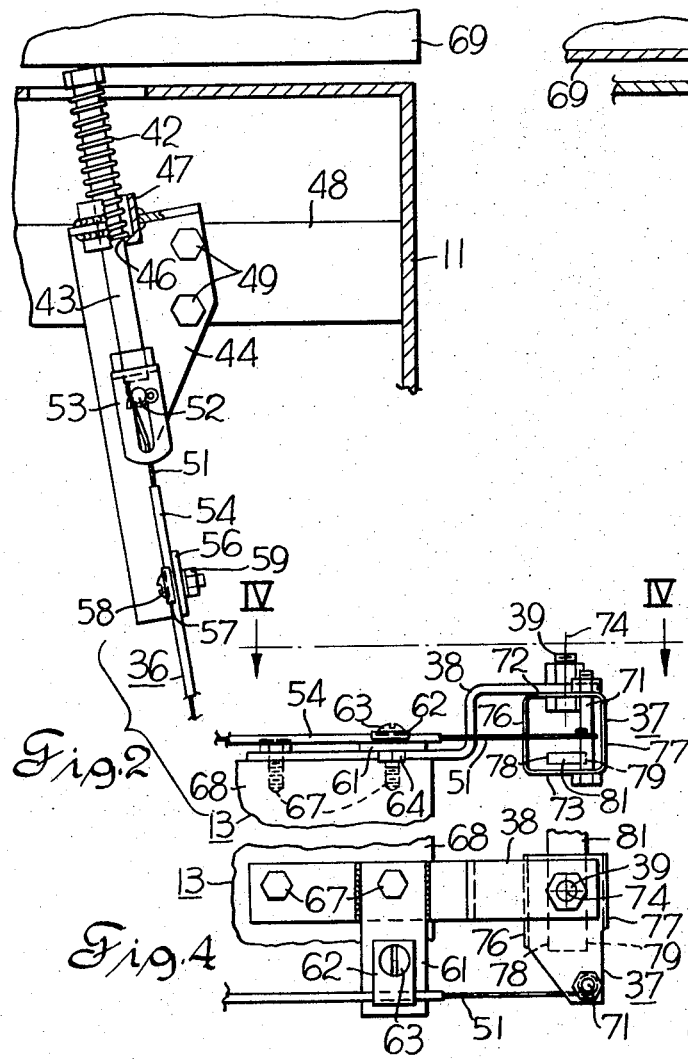
Fig.2
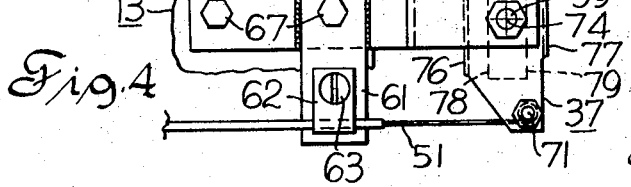
Fig.4
Fig.3
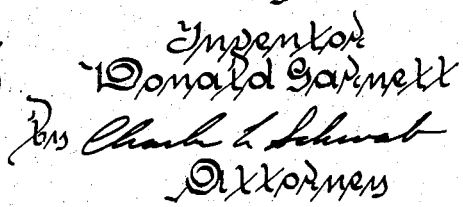
Inventor
Donald Garnett

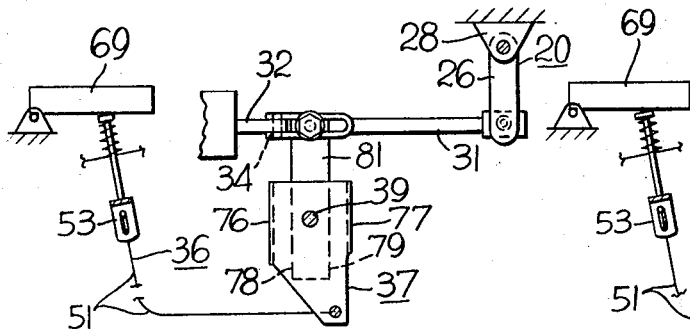
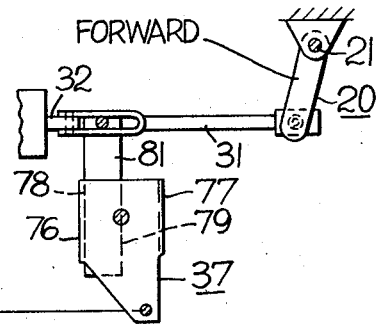
Fig.5  Fig.8
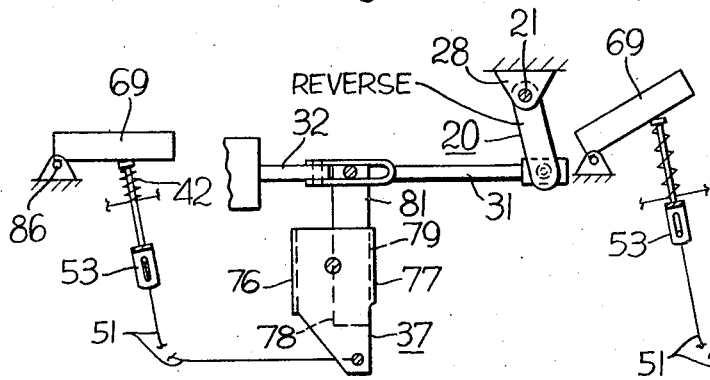
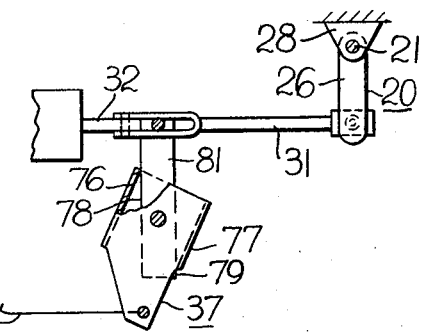
Fig.6  Fig.9
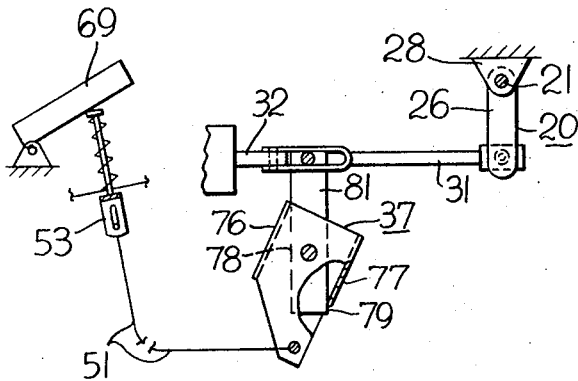
Fig.7

3,700,062

NEUTRAL DEVICE FOR INTERNAL COMBUSTION ENGINE POWERED TRUCKS

This invention relates to means for automatically returning a transmission control to neutral upon the operator's seat being vacated.

Heretofore a variety of mechanisms have been proposed and utilized to shift a vehicle transmission to neutral upon the operator's seat being vacated. One such prior art mechanism is shown in U.S. Pat. No. 3,265,150, Automatic Return to Neutral Mechanism for Vehicle Transmission, issued Aug. 9, 1966 to Dean P, Westman wherein a pair of cables act upon the transmission shift control linkage to return it to its neutral position upon the operator's seat being vacated. In applying this prior art transmission disengaging mechanism to a lift truck, the cables extend from beneath the seat to the steering column mounted portion of the shift linkage with intermediate portions passing beneath the floorboard of the operator's station.

This prior design has required modifications in its application to various models and sizes of lift trucks even though the same model transmission is used. Also, the cables of the prior design were exposed to accidental damage by the operator's feet.

In the present invention, the mechanism for returning the transmission to neutral is mounted on the transmission rather than on the forward wall of the operator's station, as in the prior design, thus permitting the same return-to-neutral mechanism to be used in the various sizes and models of lift trucks which use the same model transmission. Also, by mounting the portion of the return-to-neutral mechanism which acts upon the transmission control on the transmission housing, such portion is beneath and protected by the floorboard of the operator's compartment. Not only is the motion transmitting means (in the form of a cable) of less length than in prior designs, but the mounting on the transmission housing assures a positive acting mechanism substantially free of the lost motion effects of worn pivots in the transmission control linkage.

It is a primary object of this invention to provide an improved means for returning the manually operated transmission control to a neutral position when the operator's seat is vacated.

It is a further object of this invention to provide a seat actuated return-to-neutral mechanism for a vehicle transmission which is not subject to accidental damage by the operator.

It is a further object of this invention to provide an improved return-to-neutral control which is less expensive than prior devices and substantially avoids the need for readjustment caused by wear in the transmission shift control linkage.

It is a further object of this invention to provide an improved return-to-neutral mechanism for a vehicle transmission which can be interchangeably used on various sizes and models of lift trucks employing the same transmission.

These and other objects and advantages of this invention will be apparent to those familiar with the art when the following description is read in conjunction with the drawings in which:

FIG. 1 is a side view of a lift truck having portions exposed to show the seat operated return-to-neutral mechanism of this invention;

FIG. 2 is an enlarged view of the return-to-neutral mechanism shown in FIG. 1;

FIG. 3 is an end view of the return-to-neutral mechanism illustrated in FIG. 2;

FIG. 4 is a view taken along the line IV—IV in FIG. 2;

FIG. 5 is a schematic view of the present invention showing the transmission control linkage in neutral and the seat in an occupied position;

FIG. 6 is a schematic view similar to FIG. 5 showing the transmission control shifted to a reverse drive establishing position;

FIG. 7 is a schematic view similar to FIG. 6 showing the operator's seat in an unoccupied position and transmission shift control returned to a neutral position;

FIG. 8 is a schematic view similar to FIG. 5 showing the transmission shift control in a forward position; and FIG. 9 is a schematic view similar to FIG. 8 showing the operator's seat in an unoccupied position and the transmission shift control returned to a neutral position.

DETAILED DESCRIPTION OF THE INVENTION

Referring to FIG. 1, the present invention is shown incorporated in a lift truck including a chassis 11 on which an engine 12 is mounted. A transmission 13 is rigidly secured to the engine 12 by fastening means, not shown, and includes an output shaft 14 connected in driving relation to a pair of front drive wheels 16, only one of which is illustrated. The nonpowered rear wheels 17 are steered by steering wheel 18 mounted on a steering column 19. A manual transmission control 20 includes a gearshift shaft 21 which is pivotally mounted in a bracket 22 secured to the steering column 19. A conventional gearshift lever 23 is rigidly secured to the upper end of shaft 21. The lower end of the shaft 21 is pivotally mounted in a bracket 24 secured to the chassis 11 and an arm 26 is rigidly secured thereto. As shown schematically in FIG. 5, the shaft 21 is pivotally connected to a bracket 28 on the chassis 11 and the arm 26 is pivotally connected to the forward end of reciprocating shift rod 31. Rod 31 is connected to a transmission control valve spool 32 by a pin 34 extending through a bore in the end of the spool 32 and through leg portions of the clevislike rear end of rod 31.

Referring also to FIGS. 2, 3 and 4, the return-to-neutral mechanism 36 of this invention includes a control structure 37 pivotally connected to support member 38 by pivot bolt 39 and a motion transmitting means in the form of a cable 51 extending between a seat assembly 69 and the control structure 37. One end of the cable 51 is connected to a clevis part 53 of a plunger 43 by a pin 52. The plunger 43 is reciprocably mounted in a bore 46 of a cylindrical part 47 secured by welding to a bracket 44 which in turn is rigidly secured to a longitudinal part 48 of the chassis 11 by a pair of cap screws 49. The plunger 43 is biased upwardly by a coil spring 42 interposed between the head of the plunger and cylindrical part 47 thus providing a spring assembly 42, 43 for raising the seat assembly 69 to its unoccupied position shown in FIGS. 7 and 9. The cable 51 is enclosed in sheathing 54, the upper end of which is secured to a flange 56 of the bracket 44 by a clip 57 held in place by a screw 58 and nut 59. The lower end of the sheathing 54 is secured in a similar manner to a flange 61 by a clip 62 held in place by screw 63 and nut 64. The flange 61 is welded to the support member 38 and the support member is rigidly secured by cap screws 67 to the housing 68 of the transmission 13. The lower end of the cable 51 is fastened to the control structure 37 by an upstanding bolt 71 connected to upper and lower legs 72, 73. It will be noted that the cable 51 is connected to the control structure at a point spaced laterally of the axis 74 of bolt 39 about which the control structure 37 pivots. The control structure 37 includes a pair of vertical walls 76, 77 constituting longitudinally spaced shoulders in confronting relation to abutment surfaces 78, 79 on longitudinally opposite sides of a laterally extending lug 81 rigidly secured to shift rod 31 by bolt 82 and nut 83. As hereinafter explained, the lug 81 and control structure 37 interact to return the shift control 20 to neutral should the operator vacate the seat 69 with the transmission left in a drive establishing position.

OPERATION

FIGS. 1, 2, 3 and 4 show the operator's seat 69 in its occupied position wherein the weight of the operator acting through the seat on plunger 43, compresses spring 42 and positions the plunger 43, cable 51 and control structure 37 in a first position in which the transmission control 20, including control elements 31, 32, can be shifted between any of its neutral and drive establishing positions.

In FIG. 5 the control structure 37 is in its first or seat occupied position and the shift control is in neutral. In this condition the lug 81 is disposed intermediate the confronting shoulders 76, 77 of the control structure and the control 20 may be manually moved between its various positions.

When the shift control 20 is moved to its reverse drive establishing position, as shown in FIG. 6, the transmission control element 31 including its lug 81 is shifted forwardly (to the right as illustrated) in the direction of its axis thereby placing its abutment surface 79 in close proximity to the shoulder 77 on the control structure. If the operator now vacates the seat 69, with the transmission control in its reverse position, it will pivot upwardly on its axis 86 under the biasing action of spring 42 to the unoccupied position shown in FIG. 7. As the seat thus pivots upwardly to its unoccupied position, the cable 51 acts as a motion transmitting member to pivot the control structure 37 to its second position as shown in FIG. 7. As the control structure shifts from its first position to its second position, the shoulder 77 contacts abutment surface 79 of lug 81 and forces the elements of the shift control 20 to their neutral position as shown in FIG. 7.

In FIG. 8 the shift control 20 has been adjusted to its forward drive establishing position wherein the valve spool 32 and rod 31 have been shifted rearwardly (to the left as viewed in the drawings) and the abutment surface 78 of lug 81 is placed in close proximity to shoulder 76 of control structure 37. If the operator vacates the seat with the shift control in its forward position, the cable 51 will shift the control structure 37 from its first position, as shown in FIG. 8, to its second position, as shown in FIG. 9. When the control structure 37 is thus shifted from its first to its second position, its shoulder 76 will abut surface 78 of lug 81 and force the latter and elements 31, 32 to their neutral position.

The automatic return-to-neutral mechanism hereinbefore described has been found to be reliable, less expensive than previous mechanisms and less subject to accidental damage. Further, the present invention provides a mechanism which can be made standard for various sizes and models of lift trucks using the same transmission.

The embodiments of the invention in which an exclusive property or privilege is claimed are defined as follows:

1. An automatic return-to-neutral mechanism for a transmission of a vehicle comprising:
   an operator's seat assembly mounted on said vehicle for movement from an occupied position upwardly to an unoccupied position,
   a spring assembly mounted on said vehicle and operative to move said seat assembly to its unoccupied position when vacated,
   a transmission control element shiftable in opposite directions from a a neutral position to drive establishing positions and presenting a pair of oppositely facing abutment surfaces disposed normal to the direction of shifting of said control element,
   a control structure mounted on said vehicle for pivotal movement between first and second positions including a pair of shoulders operable to engage said abutment surfaces, respectively, thereby moving said transmission control element from its drive establishing positions to its neutral position when said control structure is pivoted from its first position to its second position both said shoulders moving in the same rotational direction and
   a single axially shiftable cable connected at one end to one of said assemblies and connected at its opposite end to said control structure, said cable pivoting said control structure from its first position to its second position when said seat moves from its occupied position to its unoccupied position.

2. The invention of claim 1 wherein said transmission includes a housing and said control structure is pivotally mounted on said housing.

3. The invention of claim 2 wherein said transmission control element is mounted in reciprocably shiftable relation to said housing.

4. The invention of claim 3 wherein the pivot axis of said control structure is spaced from said control element.

* * * * *